United States Patent [19]

Michel et al.

[11] Patent Number: 5,637,131
[45] Date of Patent: Jun. 10, 1997

[54] AGENT COMBINATIONS TO INHIBIT OR CONTROL NITRIFICATION OF AMMONIA NITROGEN IN CULTIVATED SOILS AND SUBSTRATES

[75] Inventors: Hans J. Michel, Leipzig; Sieghard Lang, Cunnersdorf; Hans J. Hartbrich, Halle; Margit Grabarse, Seelingstädt; Heinz Böhland; Klaus Möckel, both of Muhlhausen; Hermann Thieme, Wittenberg, all of Germany

[73] Assignee: SKW Stickstoffwerke Piesteritz GmbH, Wittenberg, Germany

[21] Appl. No.: 318,688

[22] PCT Filed: Apr. 1, 1993

[86] PCT No.: PCT/DE93/00305

§ 371 Date: Nov. 14, 1994

§ 102(e) Date: Nov. 14, 1994

[87] PCT Pub. No.: WO93/21134

PCT Pub. Date: Oct. 28, 1993

[30] Foreign Application Priority Data

Apr. 8, 1992 [DE] Germany ............ 42 11 808.5

[51] Int. Cl.$^6$ .................. C05C 9/00; C05G 3/08
[52] U.S. Cl. ...................... 71/28; 71/902
[58] Field of Search ................ 71/1, 11, 27, 28, 71/902

[56] References Cited

U.S. PATENT DOCUMENTS 4,523,940  6/1985  Arndt et al. .................. 71/11

FOREIGN PATENT DOCUMENTS 0289757  11/1988  European Pat. Off. .
222471A3  5/1985  Germany .
4018395A1  2/1992  Germany .

*Primary Examiner*—Ferris Lander
*Attorney, Agent, or Firm*—Henry M. Feiereisen

[57] ABSTRACT

It is the object of the present invention to develop agent combinations having an improved synergistic effect with regard to the inhibition or control of ammonium nitrogen nitrification.

It was unexpectedly found that agent combinations which consist of at least one compound of the general formula $$A_b \left[ M_n \left[ \begin{array}{c} R_1 \\ \diagup\diagdown \\ N\diagdown N \\ | \\ Z \end{array} CH_3 \right]_s \right] X_q$$

with

M with n=1 and greater than 1—in case of coordination compounds—standing for several mono- and multivalent metal ions, but being negated with n=0 in case of metal salts of substituted pyrazoles, A being the counterion in case of anion complexes and pyrazolates, preferably ammonium, alkali and alkaline earth, the 3-methyl pyrazolium cation in case of anion complexes and additionally Fe and Al in case of metal salts; b being in the range of 0 to 4, X being the same or different and embodying several mono- and multivalent inorganic or organic anions with q=0 to 6, $R_1$ being hydrogen, methyl or halogen and Z representing hydrogen, $CONH_2$, $CNHNH_2$ or $CSNH_2$, s adopting values between 1 and 6 and dicyandiamide result in a considerable improvement of inhibition of the nitrification process.

8 Claims, No Drawings

AGENT COMBINATIONS TO INHIBIT OR CONTROL NITRIFICATION OF AMMONIA NITROGEN IN CULTIVATED SOILS AND SUBSTRATES

The invention refers to agent combinations to inhibit or control respectively nitrification of ammonium nitrogen—particularly originating from mineral and organic fertilizers—in cultivated soils and substrates.

For the purpose of reducing ammonium nitrogen losses in soils due to nitrification and, thus, considerably improving utilization of fertilizing nitrogen on the one hand and minimizing nitrate load on ground and surface waters on the other hand, the soil is usually supplied with suitable substances which cause the inhibition or control respectively of the nitrification process.

It is well-known that substituted pyrazoles (U.S. Pat. No. 3,494,757, DD 131 063, DD 133 088 and DE 4 018 395), chemical complex compounds (DD 230 523 and U.S. Pat. No. 4,523,940) as well as metal salts of unsubstituted pyrazole (JA 72-47 182) and of substituted pyrazoles (U.S. Pat. No. 4,522,642) inhibit the nitrification process. Dicyandiamide has the same properties (DE 2 531 962, JA 73-90 850, FR 1 232 366). It was furthermore shown that agent combinations of substituted pyrazoles and/or their azolium salts as well as dicyandiamide induce synergistically conditioned improvements of retardation of the nitrification process (DD 222 471).

It is the object of the invention to develop agent combinations of improved synergistic action as regards the inhibition or control respectively of ammonium nitrogen nitrification and therefore allow them to be applied more effectively as compared to individual compounds or the known combinations.

It was found that agent combinations which consist of at least one compound of the general formula I

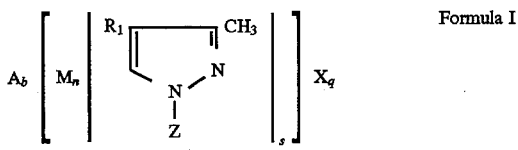

Formula I with

M with n=1 and greater than 1—in case of coordination compounds—standing for several mono- and multivalent metal ions, preferably for alkaline earth, Fe, Zn, Ni, Co, Mn, Cu, Cr, Mo and Al, but being negated with n=0 in case of metal salts of substituted pyrazoles, A being the counterion in case of anion complexes and pyrazolates, preferably ammonium, alkali and alkaline earth, the 3-methylpyrazolium cation in case of anion complexes and additionally Fe an Al in case of metal salts; b being in the range of 0 to 4, X being the same or different and embodying several mono- and multivalent inorganic or organic anions such as acetate, nitrate, sulfate, halide, thiocyanate with q being in the range of 0 to 6, $R_1$ being hydrogen, methyl or halogen and Z representing hydrogen, $CONH_2$, $CNHNH_2$ or $CSNH_2$, but being of no significance in case of pyrazolates, s adopting values between 1 and 6 and dicyandiamide according to formula II

Formula II result in a considerable improve of inhibition of the nitrification process.

The effect is surprising from the chemist's point of view because it was to be expected that the guanidine being formed in the soil in the course of DCD-decomposition—which is stronger basic and therefore more nucleophilic (Rathsack: Landwirtschaftliche Forschung 7/1954/55 p. 116 ... 123)—would expel the differently substituted pyrazoles with less ligand properties, from their coordination sphere by ligand replacement reactions. This way, the residual effect would be affected and, thus, the increased expenditure for the production/application of coordination compounds in the combination according to the invention would not be justified.

The improved nitrification inhibition of the combination according to the invention manifests itself in an extended long-time action and is definitely based on synergistic effects.

These improvements of synergistic effects appear within the following range of mixing ratios of both combination partners: 1 to 1 up to 1 to 400, but preferably 1 to 10 up to 1 to 100 (compound according to formula I:dicyandiamide).

As the results—including several structural options—show, dicyandiamide embodies the synergist to the individual coordination compounds. Therefore, the combinations according to the invention have the advantage to show higher residual effects as against the individual compounds as well as the known agent combination of substituted pyrazoles with DCD and, thus, the quantity of application can be considerably reduced with the long-time action being improved. This results in lower process costs, a reduction of the load on the ecological system and the possibility of earlier application of nitrogen fertilizers.

The combinations according to the invention can be applied as a mixture or with solid or liquid mineral or organic fertilizers which contain urea and/or ammonia and/or ammonium nitrogen. They can be applied in the form of a solid or liquid concentrate, such as water, or mixed with a solid, ground or granulated carrier as well.

The combinations according to the invention can also be applied with other agrochemicals, such as pesticides, and with other agrotechnical measures. It is advisable to apply the combinations directly before, simultaneously with or directly after the application of fertilizers, the amount of application being between 0.2 and 50 kg of agent per hectare, preferably 0.5 to 20 kg per hectare. If they are applied with a solid or liquid fertilizer, a quantity of 0.1 to 50 weight % of the fertilizer—preferably 1 to 30 weight % of the fertilizer nitrogen—can be used.

The following examples are to explain the invention without restricting it.

Table 1 gives a general idea of some compounds particularly synthesized for their combination with DCD the nitrification inhibiting effect of which has already been discribed in the patents DD 230 529 and DE 40 18 395. On that basis, individual compounds were selected to be combined with dicyandiamide. It is the declared object of this invention to prove by means of the following examples (tables 2 and 3) that by the combination with dicyandiamide an improvement of the synergistic effect is achieved which is independent of the structural type of the metal complex and which is reflected in an increase in the residual effect.

TABLE 1

| No. of compound | Structure | Inhibition in % after ... days | | | | |
|---|---|---|---|---|---|---|
| | | 14 | 28 | 42 | 56 | 70 |
| 1 | [Zn(Y)₄]Cl₂ | 100 | 94 | 100 | 76 | 71 |
| 2 | [Zn(Y)₄]SO₄ | 100 | 82 | 100 | 71 | 72 |
| 3 | [CO(Y)₄]SO₄ | 99 | 75 | 100 | 80 | 75 |
| 4 | [CO(Y)₄]Cl₂ | 100 | 93 | 100 | 84 | 78 |
| 5 | [NI(Y)₄](CH₃COO)₂ | 100 | 81 | 100 | 81 | 80 |
| 6 | [Ni(Y)₆](BF₄)₂ | 99 | 100 | 100 | 68 | 65 |
| 7 | [Zn(Y)₃H₂O]SO₄ | 94 | 93 | 92 | 88 | 79 |
| 8 | [(NH₄)₂Zn(Y)₂(NCS)₄]xH₂O | 100 | 93 | 96 | 86 | 78 |
| 9 | [Mn(Y)₂(H₂O)₂]SO₄ | 100 | 93 | 100 | 78 | 79 |
| 10 | (YH)₂[ZnCl₂(NCS)₂] | 100 | 95 | 88 | 75 | 70 |
| 11 | [Cu(Y)₄Cl₂]xH₂O | 100 | 93 | 100 | 55 | 51 |
| 12 | [Mg(Y)₂(H₂O)]SO₄ | 100 | 94 | 100 | 84 | 71 |
| 13 | [Mg(Y)₂]SO₄ | 100 | 100 | 100 | 87 | 82 |
| 14 | [CO(Y)₄](CH₃COO)₂ | 83 | 90 | 84 | 77 | 75 |
| 15 | [Co(Y)₂]F₂ | 84 | 93 | 84 | 77 | 76 |
| 16 | [CO(Y)₄](SiF₆) | 82 | 90 | 84 | 78 | 75 |
| 17 | [Ni(Y)₆]I₂ | 82 | 92 | 85 | 80 | 77 |
| 18 | [Mg(Y)₆]Cl₂ | 100 | 100 | 100 | 88 | 82 |
| 19 | Ca(L)₂ | 98 | 93 | 84 | 79 | 69 |
| 20 | NaL | 99 | 97 | 80 | 75 | 70 |
| 21 | [Mg(K)₂](NO₃)₂ | 100 | 100 | 98 | 82 | 78 |
| 22 | [Cu(G)₂]Cl₂ | 99 | 99 | 99 | 88 | 55 |
| 23 | [Cu(G)]Cl₂ | 99 | 99 | 99 | 91 | 65 |
| 24 | [Zn(G)₂]Cl₂ | 99 | 99 | 99 | 88 | 61 |
| 25 | [Ni(G)₂]Cl₂x2H₂O | 100 | 100 | 99 | 85 | 39 |

Y = 3-mathylpyrazole
L = 3-methylpyrazolate ion
K = 1-carbamoyl-3-methylpyrazole
G = 1-guanyl-3-methylpyrazole

EXAMPLE 1

The combinations of compond 18 (table 1) and dicyandiamide according to the invention were added to a sandy loam soil at mixing ratios between 1 to 1 and 1 to 400 and different absolute active substance concentrations.

Concentration series of compound 18 (0,3 to 1,5 ppm) and dicyandiamide (8 to 20 ppm) were taken as a comparison. At the same time, a nitrogen dose of 20 mg N per 100 g of soil was applied in the form of urea. After wetting the soil to 50% of the maximum water capacity, incubation took place at 20° C. and the content of nitrate or nitrite nitrogen formed was determined after 14,28,42,56 and 70 days.

Nitrification inhibition in percent is calculated as follows:

$$\% \text{ of inhibition} \frac{a-b}{a-c} \cdot 100$$

a—nitrite and nitrate content of the control
b—nitrite and nitrate content of the sample with active substance
c—nitrite and nitrate content of the soil used

TABLE 2

Residual effect of compound 18, dicyandiamide and their combinations

| Compound 18 (ppm) | Dicyandiamide (ppm) | Mixing ratio | Inhibition in % after ... days | | | |
|---|---|---|---|---|---|---|
| | | | 28 | 42 | 56 | 70 |
| 0,3 | — | — | 50 | 20 | 0 | 0 |
| 0,5 | — | — | 80 | 50 | 18 | 3 |
| 0,8 | — | — | 93 | 87 | 55 | 45 |
| 1,2 | — | — | 100 | 94 | 67 | 63 |
| 1,5 | — | — | 100 | 100 | 93 | 80 |
| — | 8 | — | 51 | 15 | 0 | 0 |
| — | 10 | — | 63 | 30 | 10 | 0 |
| — | 12 | — | 70 | 45 | 21 | 0 |
| — | 16 | — | 82 | 53 | 30 | 3 |
| — | 20 | — | 85 | 60 | 35 | 10 |
| 0,5 | 0,5 | 1:1 | 80 | 62 | 51 | 40 |
| 0,6 | 5 | 1:10 | 85 | 75 | 62 | 53 |
| 0,25 | 5 | 1:20 | 74 | 51 | 31 | 4 |
| 0,20 | 16 | 1:80 | 88 | 71 | 53 | 45 |
| 0,10 | 10 | 1:100 | 78 | 63 | 44 | 31 |
| 0,06 | 12 | 1:200 | 75 | 61 | 45 | 28 |
| 0,056 | 20 | 1:360 | 71 | 55 | 48 | 35 |
| 0,025 | 16 | 1:400 | 73 | 68 | 51 | 40 |

As table 2 shows, an extended residual effect is achieved by the combination of compound 18 with dicyandiamide along the whole mixing range depending on the absolute agent concentration.

The best improvement of the effect is achieved with a mixing ratio of 1 to 10 up to 1 to 100.

Therefore, mixing ratios of 1 to 25, 1 to 50 and 1 to 75 have been chosen for the following examples.

EXAMPLE 2

The compounds 9, 10, 18, 19 and 21 (table 1) were combined with dicyandiamide at mixing ratios of 1 to 25, 1 to 50 and 1 to 75, and the residual effect compared with the pure agents.

The agents and combinations were therefore mixed with a loamy sand soil at the mixing ratios given in table 3 and the absolute agent concentrations. Liquid manure (20 mg of total N per 100 g of soil) served as N-source.

The tests and the calculation of the percentile inhibition were carried out analogously to example 1.

TABLE 3

Residual effect of different metal complexes, metal pyrazolates and dicyandiamide as well as the respective combinations of these compounds with dicyandiamide in comparison with 3-methyl pyrazole

| Substance/ combination | ppm | Inhibition in % after ... days | | | | |
|---|---|---|---|---|---|---|
| | | 14 | 28 | 42 | 56 | 70 |
| compound 9 | 0,5 | 78 | 48 | 25 | 0 | 0 |
| 1:25 | 10 | 94 | 92 | 87 | 70 | 40 |
| 1:50 | 10 | 96 | 93 | 88 | 72 | 41 |
| 1:75 | 10 | 96 | 93 | 88 | 75 | 38 |
| compound 10 | 0,5 | 77 | 51 | 30 | 0 | 0 |
| 1:25 | 10 | 98 | 97 | 88 | 74 | 42 |
| 1:50 | 10 | 100 | 93 | 85 | 68 | 38 |
| 1:75 | 10 | 97 | 95 | 85 | 68 | 35 |
| compound 18 | 0,5 | 85 | 53 | 35 | 0 | 0 |
| 1:25 | 10 | 98 | 96 | 93 | 82 | 45 |
| 1:50 | 10 | 98 | 92 | 88 | 78 | 42 |
| 1:75 | 10 | 97 | 94 | 90 | 78 | 43 |
| compound 19 | 0,5 | 94 | 66 | 23 | 13 | 0 |
| 1:25 | 10 | 98 | 92 | 90 | 75 | 47 |
| 1:50 | 10 | 99 | 96 | 92 | 78 | 52 |
| 1:75 | 10 | 97 | 91 | 90 | 69 | 44 |
| compound 21 | 0,5 | 96 | 91 | 45 | 23 | 10 |
| 1:25 | 10 | 98 | 92 | 89 | 72 | 46 |
| 1:50 | 10 | 97 | 90 | 89 | 77 | 48 |
| 1:75 | 10 | 97 | 91 | 86 | 73 | 45 |
| dicyandiamide | 10 | 86 | 78 | 37 | 0 | 0 |
| | 15 | 98 | 94 | 71 | 33 | 0 |
| | 20 | 100 | 100 | 83 | 72 | 48 |
| 3-methylpyrazole | 0,5 | 76 | 55 | 21 | 0 | 0 |
| 1:25 | 10 | 94 | 92 | 78 | 61 | 30 |
| 1:50 | 10 | 96 | 95 | 82 | 62 | 33 |
| 1:75 | 10 | 95 | 92 | 88 | 58 | 29 |

Table 3 makes it obvious that the combinations of active substances in the given mixing ratios cause considerable action improvements both in comparison with the individual components and with the known agent combination 3-methyl pyrazole/DCD.

EXAMPLE 3

Compound 24 was used as combination partner of DCD. The combinations according to the invention and urea as N-source were added to a chernozemlike sandy loam soil in the mixing ratios and concentrations given in table 4. Then they were wetted to 50% of the maximum water capacity and mixed thoroughly. The N-dose was 20 mg of N per 100 g of soil. The thoroughly mixed soil samples were filled into plastic bottles, closed, incubated at 20° C. and the course of nitrite and nitrate formation as well as ammonia nitrogen reduction are observed.

The same experimental setup without addition of agents served as a control. Sampling was made variable depending on the inhibitive effect. After logarithmic transformation of the sum of nitrite and nitrate content and the incubation time in days, the reading values of the individual combination partners or mixing ratios respectively were calculated by means of linear regression and the $T_{50}$—value—representing the days after which 50% of fertilizing nitrogen were nitrified in the soil—was determined.

TABLE 4

Percentile agent economy or improvement respectively as compared with the values according to the equivalence model

| Mixing ratio compound 24:DCD | Concentration of combinations (ppm) | Dose economy % | Improvement of action (days) |
|---|---|---|---|
| 0,2:99,8 | 22,55 | 0 | 0 |
| 0,2:99,8 | 45,1 | 70 | 7,4 |
| 2:98 | 12,75 | 89 | 25,0 |
| 2:98 | 25,5 | 78 | 11,0 |
| 15:85 | 2,95 | 62 | 23,0 |
| 15:85 | 5,9 | 86 | 20,0 |

Table 4 and in particular table 3 make clear that the agent combination of coordination compounds, especially of 1-guanyl-3-methylpyrazole with DCD results in a considerable improvement of action along the whole range of mixing ratios in comparison with the known solution according to DD 222 471.

What we claim:

1. Agent combination to inhibit or control nitrification of ammonium nitrogen in cultivated soils or substrates respectively which contain a compound of the general formula I

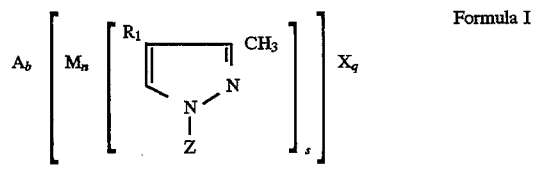

Formula I with

M with n=1 and greater than 1 and standing for mono- and multivalent metal ions selected from the group consisting of alkaline earth, Fe, Zn, Ni, Co, Mn, Cu, Cr, Mo and Al, A being the counterion in case of anion complexes selected from the group consisting of ammonium, alkali and alkaline earth, the 3-methyl pyrazolium cation, with b being in the range of 0 to 4, X representing mono- and multivalent inorganic or organic anions especially acetate, nitrate, sulfate, halide, thiocyanate with q being in the range of 1 to 6, $R_1$ being hydrogen, methyl or halogen and Z representing hydrogen, $CONH_2$, $CNHNH_2$ or $CSNH_2$, s adopting values between 1 and 6, and dicyandiamide according to formula II

Formula II in mixing ratios of 1 to 1 up to 1:400.

2. Agent combination according to claim 1 with the active substances to be applied as a mixture or with solid or liquid mineral or organic fertilizers containing urea, ammonia or ammonium nitrogen, in the form of a solid or liquid concentrate or mixed with a solid, ground or granulated carrier.

3. Agent combination according to claim 1 to be applied before, with or after the application of fertilizers.

4. Agent combination according to claim 1 to be applied in a quantity of 0.2 to 50 kg of active substance per hectare.

5. Agent combination according to claim 4 to be applied in a quantity of 0.5 to 20 kg of active substance per hectare.

6. Agent combination according to claim 1 to be added to fertilizers in quantities of 0.1 to 50 weight % of fertilizer nitrogen.

7. Agent combination according to claim 6 to be added to fertilizers in quantities of 1 to 30 weight % of fertilizer nitrogen.

8. Agent combination according to claim 1, containing a mixing ratio between formula I and formula II of 1 to 10 up to 1 to 100.

* * * * *